United States Patent
Ho et al.

(10) Patent No.: US 9,915,560 B2
(45) Date of Patent: Mar. 13, 2018

(54) RECEIVER OPTICAL SUBASSEMBLY (ROSA) HOUSING WITH SIDEWALL RECEPTACLE TO PROVIDE ELECTRICAL ISOLATION BETWEEN AN ADJACENT TRANSMITTER OPTICAL SUBASSEMBLY (TOSA) IN A TRANSCEIVER HOUSING

(71) Applicant: Applied Optoelectronics, Inc., Sugar Land, TX (US)

(72) Inventors: I-Lung Ho, Sugar Land, TX (US); Kai-Sheng Lin, Sugar Land, TX (US); Jun Zheng, Missouri City, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 209 days.

(21) Appl. No.: 14/838,017

(22) Filed: Aug. 27, 2015

(65) Prior Publication Data

US 2017/0059394 A1   Mar. 2, 2017

(51) Int. Cl.
| | | |
|---|---|---|
| *G01J 1/02* | (2006.01) | |
| *G02B 6/42* | (2006.01) | |
| *G02B 6/43* | (2006.01) | |
| *G02B 6/293* | (2006.01) | |
| *G01J 1/04* | (2006.01) | |

(52) U.S. Cl.
CPC ............ *G01J 1/0271* (2013.01); *G01J 1/029* (2013.01); *G01J 1/0403* (2013.01); *G02B 6/2938* (2013.01); *G02B 6/29365* (2013.01); *G02B 6/4246* (2013.01); *G02B 6/4263* (2013.01); *G02B 6/4284* (2013.01); *G02B 6/4292* (2013.01); *G02B 6/4295* (2013.01); *G02B 6/43* (2013.01)

(58) Field of Classification Search
CPC ........ G01J 1/0271; G01J 1/029; G01J 1/0403; G02B 6/4295; G02B 6/43; G02B 6/4284; G02B 6/29365; G02B 6/2938; G02B 6/4292; G02B 6/4263; G02B 6/4246
See application file for complete search history.

(56) References Cited

U.S. PATENT DOCUMENTS

2005/0147419 A1* 7/2005 Verdiell ................ H01S 5/4087
398/214

* cited by examiner

*Primary Examiner* — Tony Ko
(74) *Attorney, Agent, or Firm* — Grossman Tucker Perreault & Pfleger, PLLC; Norman S. Kinsella (57) ABSTRACT

A multi-channel receiver optical subassembly (ROSA) including at least one sidewall receptacle configured to receive and electrically isolate an adjacent multi-channel transmitter optical subassembly (TOSA) is disclosed. The multi-channel ROSA includes a housing with at least first and second sidewalls, with the first sidewall being opposite the second sidewall and including at least one sidewall opening configured to fixedly attach to photodiode assemblies. The second sidewall includes at least one sidewall receptacle configured to receive at least a portion of an optical component package, such as a transistor outline (TO) can laser package, of an adjacent multi-channel TOSA, and provide electrical isolation between the ROSA housing and the TOSA within an optical transceiver. The sidewall receptacle can include non-conductive material in regions that directly or otherwise come into close proximity with the optical component package of the adjacent TOSA.

20 Claims, 7 Drawing Sheets

RECEIVER OPTICAL SUBASSEMBLY (ROSA) HOUSING WITH SIDEWALL RECEPTACLE TO PROVIDE ELECTRICAL ISOLATION BETWEEN AN ADJACENT TRANSMITTER OPTICAL SUBASSEMBLY (TOSA) IN A TRANSCEIVER HOUSING

CROSS-REFERENCE TO RELATED APPLICATIONS

This application is related to co-pending U.S. application Ser. No. 14/837,993 titled "Multi-Channel Transmitter Optical Subassembly (TOSA) With Opposing Placement of Transistor Outline (TO) Can Laser Packages" filed concurrently herewith, which is herein incorporated by reference in its entirety.

TECHNICAL FIELD

The present disclosure relates to optical transceiver modules, and more particularly, to a receiver optical subassembly (ROSA) housing with a sidewall receptacle to provide electrical isolation between an adjacent transmitter optical subassembly (TOSA) in a transceiver housing.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, insertion loss, and manufacturing yield.

Optical transceivers can include one or more transmitter optical subassemblies (TOSAs) and receiver optical subassemblies (ROSAs) for the purpose of transmitting and receiving optical signals. As optical transceiver housings scale down in size, the complexity of designing and manufacturing TOSAs and ROSAs to fit within those constrained housings, without sacrificing channel allocation and transceiver performance, continues to increase and raises numerous non-trivial issues.

BRIEF DESCRIPTION OF THE DRAWINGS

These and other features and advantages will be better understood by reading the following detailed description, taken together with the drawings wherein.

DETAILED DESCRIPTION

A multi-channel receiver optical subassembly (ROSA) including at least one sidewall receptacle configured to receive and electrically isolate an adjacent multi-channel transmitter optical subassembly (TOSA) is disclosed. The multi-channel ROSA includes a housing with at least first and second sidewalls, with the first sidewall being opposite the second sidewall and including at least one sidewall opening configured to fixedly attach to photodiode assemblies. The second sidewall includes at least one sidewall receptacle configured to receive at least a portion of an optical component package, such as a TO can laser package, of an adjacent multi-channel TOSA, and provide electrical isolation between the ROSA and the TOSA. The sidewall receptacle can include non-conductive material in a region that directly or otherwise is in close proximity with the optical component package of the adjacent TOSA. Thus a transceiver can position a multi-channel ROSA within its housing relatively close to the multi-channel TOSA such that at least one optical component package of the TOSA aligns with, and gets received by, the sidewall receptacle of the multi-channel ROSA housing.

Figure 2A:
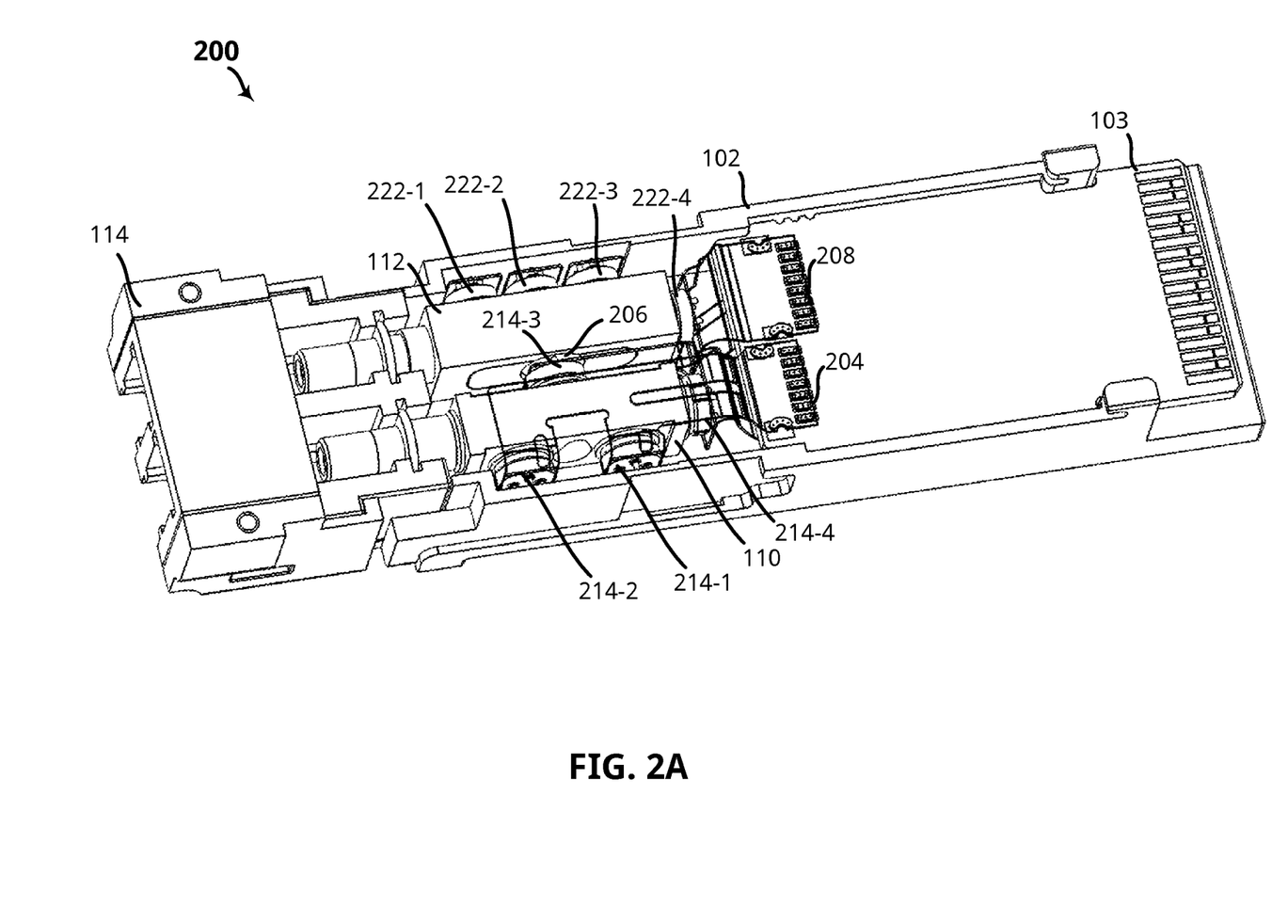
FIG. 2A is a perspective view of an example small form-factor (SFF) pluggable transceiver with a multi-channel TOSA including TO can laser packages and a multi-channel ROSA, in accordance with an embodiment of the present disclosure.

One particular example of a multi-channel TOSA particularly well suited for use in a transceiver that includes the multi-channel ROSA disclosed herein is discussed in greater detail in the co-pending U.S. application Ser. No. 14/837,993 titled "Multi-Channel Transmitter Optical Subassembly (TOSA) With Opposing Placement of Transistor Outline Can Laser Packages" filed concurrently herewith. Such a multi-channel TOSA departs from other TOSA approaches by providing staggered TO can laser packages positioned on opposing sidewalls. The multi-channel TOSA 110 of FIG. 2A illustrates one such example of a staggered and opposing TO can laser package configuration. The staggered and opposing arrangement can increase space between adjacent TO can laser packages, which can simplify laser welding processes, reduce error, and increase yield. However, this configuration may cause an undesirable electrical short within small form-factor (SFF) transceiver housings. For example, as shown in FIG. 2A, the transceiver 200 provides limited space in the housing 102 to accommodate the multi-channel ROSA 112 and the multi-channel TOSA 110. To this end, the TO can laser package 214-3 of the multi-channel TOSA 110 extends toward the multi-channel ROSA 112 and makes direct contact, or is otherwise in close proximity, with a surface of the same. Without consideration for this contact/proximity, the TO can laser package 214-3 may electrically short against the metal housing of the multi-channel ROSA 112.

Thus, in accordance with an embodiment, a multi-channel ROSA including a sidewall receptacle configured to receive at least a portion of an optical component package of an adjacent TOSA is disclosed herein. In an embodiment, the sidewall receptacle of the multi-channel ROSA includes non-conductive material to provide electrical isolation between the multi-channel ROSA and an adjacent TOSA. The multi-channel ROSA disclosed herein can be utilized within, for example, transceivers that implement QSFP standards (e.g., 40 GB-LR), and other similarly constrained or otherwise small form-factor transceivers.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

Figure 1:
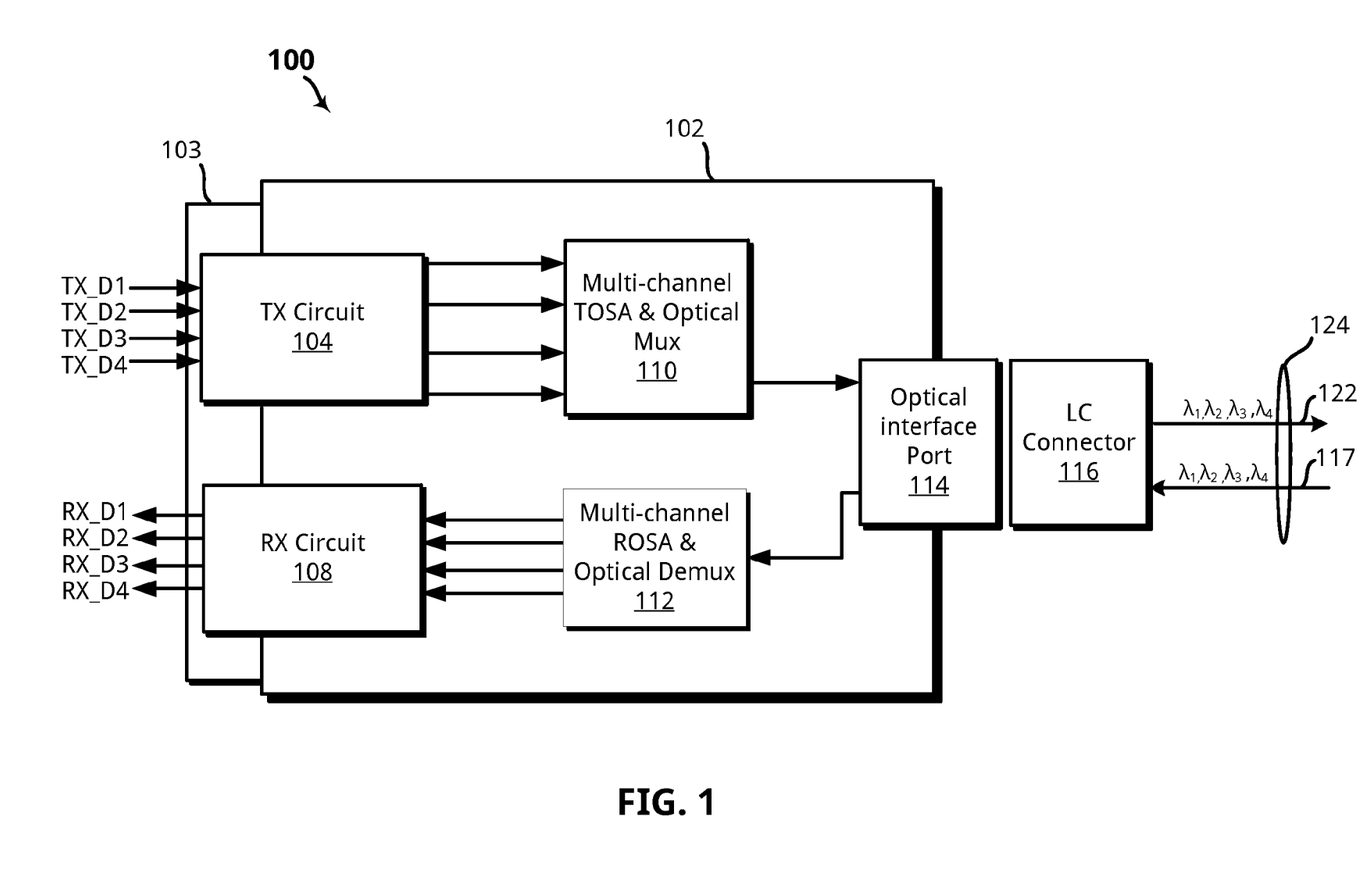
FIG. 1 schematically illustrates an embodiment of an optical transceiver module including a multi-channel transmitter optical subassembly (TOSA) and multi-channel receiver optical subassembly (ROSA).

Now turning to FIG. 1, there is an optical transceiver 100 consistent with embodiments of the present disclosure. In more detail, the optical transceiver 100 transmits and receives four (4) channels using four different channel wavelengths ($\lambda_1$, $\lambda_2$, $\lambda_3$, $\lambda_4$) and may be capable of transmission rates of at least about 10 Gbps per channel. In one example, the channel wavelengths $\lambda_1$, $\lambda_2$, $\lambda_3$, $\lambda_4$ may be 1270 nm, 1290 nm, 1080 nm, and 1330 nm, respectively. The optical transceiver 100 may also be capable of transmission distances of 2 km to at least about 10 km. The optical transceiver 100 may be used, for example, in internet data center applications or fiber to the home (FTTH) applications. In an embodiment, the optical transceiver 100 implements the specification SFF-8436 titled "QSFP+10 Gbs 4× PLUGGABLE TRANSCEIVER Rev 4.8" (hereinafter QSFP+), published on Oct. 31, 2013 by the Electronic Industries Alliance (EIA).

This embodiment of the optical transceiver 100 includes a multi-channel TOSA 110 for transmitting optical signals on different channel wavelengths, and a multi-channel ROSA 112 for receiving optical signals on different channel wavelengths. As shown, the transceiver housing 102 includes the multi-channel TOSA 110 and the multi-channel ROSA 112. A transmit connecting circuit 104 and a receive connecting circuit 108 provide electrical connections to the multi-channel TOSA 110 and the multi-channel ROSA 112, respectively, within the housing 102. The transmit connecting circuit 104 and the receive connecting circuit 108 may communicate with external systems via data bus 103. In some cases, data bus 103 is a 38-pin connector that comports with physical connector QSFP standards and data communication protocols.

In any event, the transmit connecting circuit 104 electrically couples to the electronic components in the multi-channel TOSA 110 (e.g., TO can laser packages), and the receive connecting circuit 108 electrically couples to the electronic components (e.g., the photodiode packages) in the multi-channel ROSA 112. The transmit connecting circuit 104 and the receive connecting circuit 108 include at least conductive paths to provide electrical connections, and may also include additional circuitry. The multi-channel TOSA 110 transmits and multiplexes multiple different channel wavelengths, and is coupled to an optical interface port 114. The optical interface port 114 may include an LC connector port, although other connector types are also within the scope of this disclosure. For example, the optical interface port 114 may comprise a multi-fiber push on (MPO) connector receptacle.

In cases where the optical interface port 114 comprises a duplex, or bi-directional, LC receptacle, the LC connector receptacle provides optical connections to the multi-channel TOSA 110, and provides optical connections to the multi-channel ROSA 112. The LC connector receptacle may be configured to receive and be coupled to a mating LC connector 116 such that transmit optical fiber 122 of the external fibers 124 optically couples to the multi-channel TOSA 110, and the receive optical fiber 117 of the external fibers 124 optically couples to the multi-channel ROSA 112.

The multi-channel TOSA 110 includes multiple TO can laser packages and optics for producing associated channel wavelengths, and couples the same into the transmit optical fiber 122. In particular, the lasers in the multi-channel TOSA 110 convert electrical data signals (TX_D1 to TX_D4) received via the transmit connecting circuit 104 into modulated optical signals transmitted over transmit optical fiber 122. The lasers may include, for example, distributed feedback (DFB) lasers with diffraction gratings. The multi-channel TOSA 110 may also include monitor photodiodes for monitoring the light emitted by the lasers. The multi-channel TOSA 110 may further include one or more temperature control devices, such as a resistive heater and/or a thermoelectric cooler (TEC), for controlling a temperature of the lasers, for example, to control or stabilize the laser wavelengths.

The multi-channel ROSA 112 includes multiple photodiode packages, and optics such as mirrors and filters for receiving a multiplexed optical signal and de-multiplexing the same into associated channel wavelengths, as discussed in further detail below. The multi-channel ROSA 112 can detect, amplify, and convert such optical signals received via receive optical fiber 117, and can provide the converted optical signals as electrical data signals (RX_D1 to RX_D4) that are output via the receive connecting circuit 108. In some cases, the photodiode packages can include integrated transimpedance amplifiers (TIAs).

This embodiment of the optical transceiver 100 includes 4 channels and may be configured for coarse wavelength division multiplexing (CWDM), although other numbers of channels are possible.

Referring to FIG. 2A, an example small form-factor (SFF) pluggable optical transceiver 200 with a multi-channel TOSA and a multi-channel ROSA is described and shown in greater detail. The embodiment shown in FIG. 2A is one example of the optical transceiver 100 of FIG. 1 implemented in a small form-factor. For example, the optical transceiver 200 may implement the QSFP+ specification. As shown, the optical transceiver 200 includes a transceiver housing 102, a multi-channel TOSA 110 in one region of the housing 102, and a multi-channel ROSA 112 located in another region of the housing 102. The multi-channel TOSA 110 electrically couples to transmit flexible printed circuits (FPCs) 204 and couples to the optical interface port 114 at an end of the housing 102. The multi-channel ROSA 112 electrically couples to a receive FPC 208, and couples to the optical interface port 114 at the end of the housing 102.

The multi-channel TOSA 110 includes TO can laser packages 214-1 to 214-4, with each containing optical components such as a laser diode. The TO can laser packages 214-1 to 214-4 may provide, for example, output power from 1.85 mW to 2 W, although other output power is within the scope of this disclosure. The TO can laser packages 214-1 to 214-4 may provide a broad spectrum of channel wavelengths, or may be configured to provide a relatively narrow spectrum of channel wavelengths such as a single channel wavelength. In some cases, the TO can laser packages 214-1 to 214-4 provide center wavelengths 375 nm to 1650 nm, for example. In an embodiment, the TO can laser packages 214-1 to 214-4 are Ø3.8 mm, Ø5.6 mm, or Ø9 mm TO cans, although other configurations are also within the scope of this disclosure. For instance, the TO can laser packages can include Ø9.5 mm and TO-46 cans.

The multi-channel ROSA 112 includes photodiode packages 222-1 to 222-4, with each containing optical components such as a photodiode and TIA, for example. In some cases, the photodiodes can provide about −13 dBm sensitivity, or less, for each associated channel wavelength. In an embodiment, the photodiode packages are TO-46 packages, although other package types are also within the scope of this disclosure.

As shown, the TO can laser package 214-3 of the multi-channel TOSA 110 directly contacts or is otherwise in close proximity with a surface of the multi-channel ROSA 112, and more particularly, the sidewall receptacle 206. The sidewall receptacle 206 allows the multi-channel TOSA 110, to "marry" with the multi-channel ROSA 112 such that at least a portion of the TO can laser package 214-3 extends into the housing of the multi-channel ROSA 112, as discussed in greater detail below. The sidewall receptacle 206 of the multi-channel ROSA 112 can provide electrical isolation through, for example, a non-conductive material including at least one of plastic, paper, Teflon® (Polytetrafluoroethylene), and glass, just to name a few.

Figure 2B:
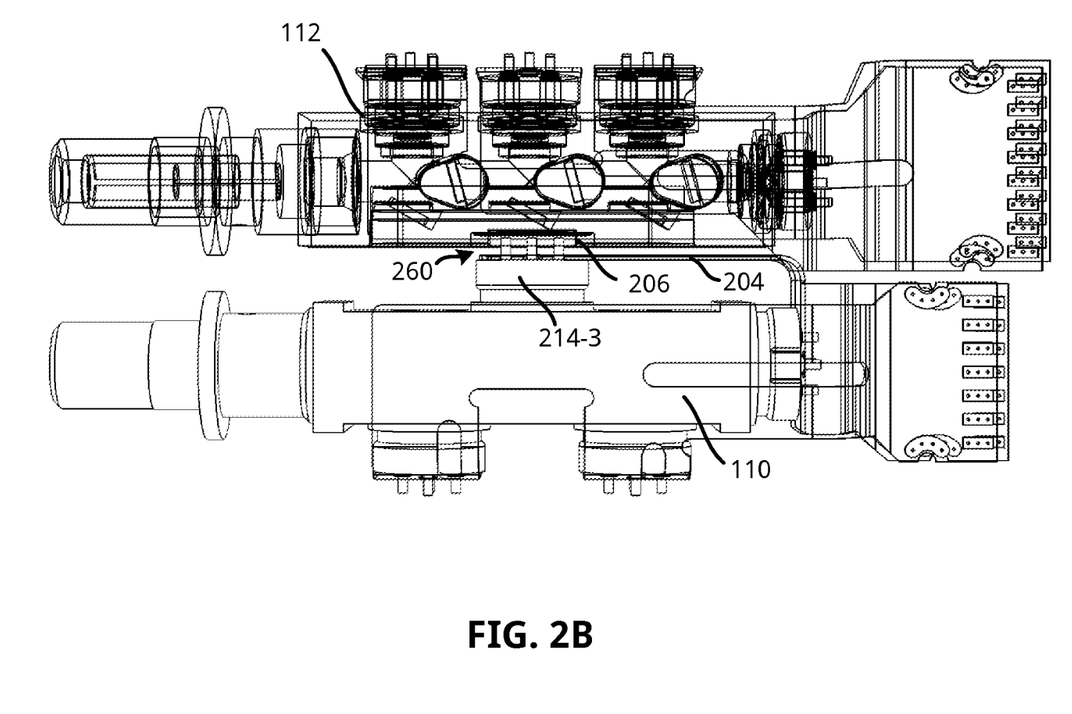
FIG. 2B is another perspective view of the multi-channel TOSA and the multi-channel ROSA of FIG. 2A, in accordance with an embodiment of the present disclosure.

Referring to FIG. 2B, the multi-channel TOSA 110 is shown positioned adjacent the multi-channel ROSA 112, in accordance with an embodiment of the present disclosure. For the purpose of clarity, FIG. 2B includes a wireframe representation of the multi-channel ROSA 112 to illustrate the sidewall receptacle 206 in greater detail. As shown, at least a portion of the pins of the TO can laser package 214-3 extend from the multi-channel TOSA 110 into the sidewall receptacle 206. The gap 260 between the TO can laser package 214-3 and the multi-channel ROSA 112 can measure approximately 0.2 mm to 0.5 mm, for example. The gap 260 allows the transmit FPC 204 to fit between the TO can laser package 214-3 and the multi-channel ROSA 112, and electrically couple to the pins of the TO can laser package 214-3. In the embodiment shown, the FPC 204 rests substantially flat against the TO can laser package 214-3 such that a proximal end of the pins makes electrical contact with the FPC 204, which may assist in avoiding having the FPC 204 short against the multi-channel ROSA 112.

Figure 3:
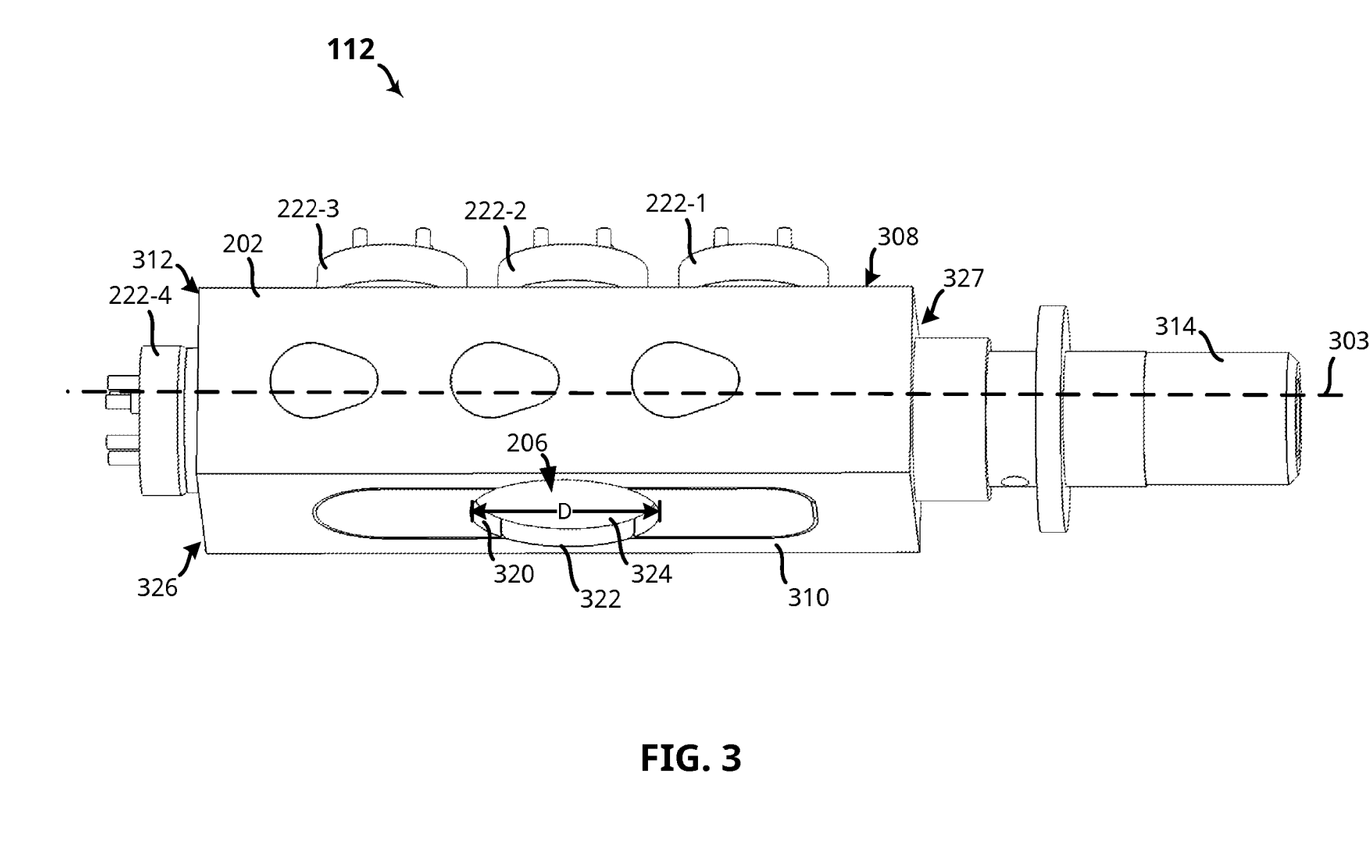
FIG. 3 is a perspective view of an embodiment of the multi-channel ROSA for use in the optical transceiver shown in FIG. 2A.

Referring to FIG. 3, the multi-channel ROSA 112 for use in the optical transceiver 200 shown in FIG. 2A is shown in greater detail. As shown, the multi-channel ROSA 112 includes the housing 202 with first and second sidewalls 308 and 310, respectively, positioned on opposite sides of the housing 202 and extending generally in parallel along a first major axis 303 from a first end 326 to a second end 327. The first sidewall 308 includes a plurality of photodiode packages 222-1 to 222-3 fixedly attached thereto. The housing 202 also includes an end sidewall 312 that adjoins the first and second sidewalls 308 and 310. The end sidewall 312 includes a photodiode package 222-4 fixedly attached thereto. Opposite the end sidewall 312, the second end 327 of the housing 202 includes an optical coupling receptacle 314. The optical coupling receptacle 314 allows the multi-channel ROSA 112 to optically couple to the receive optical fiber 117 of the external fibers 124 (FIG. 1).

Figure 5A:
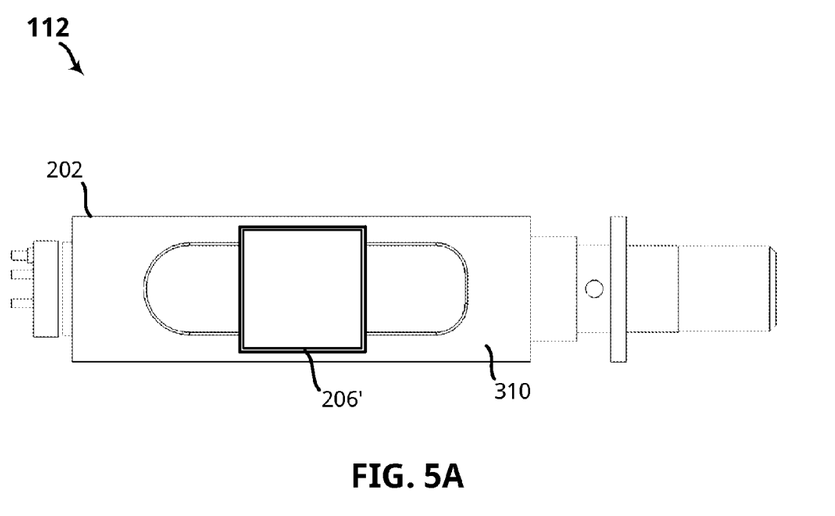
FIG. 5A shows a perspective view of an embodiment of a multi-channel ROSA having a rectangular sidewall receptacle, in accordance with an embodiment of the present disclosure.
Figure 5B:
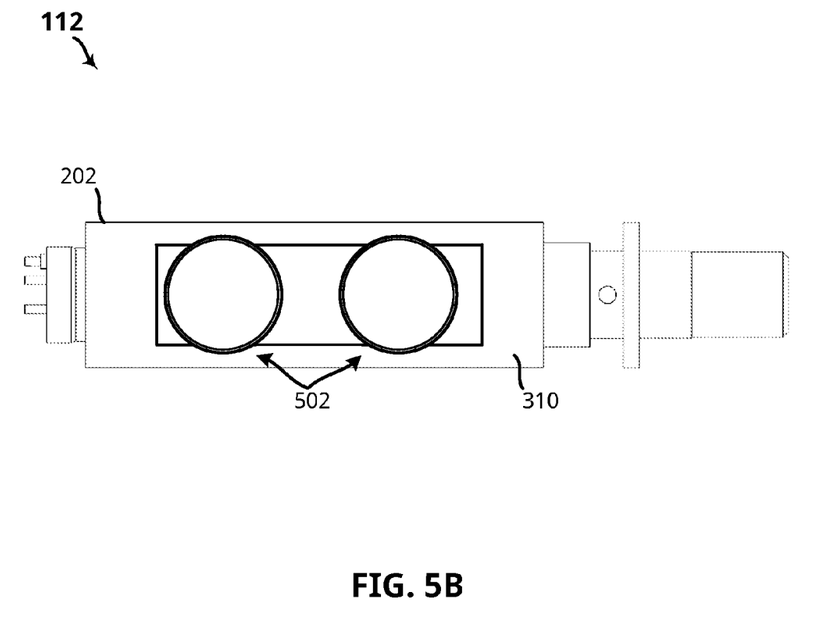
FIG. 5B shows another perspective view of an embodiment of a multi-channel ROSA having a plurality of sidewall receptacles, in accordance with an embodiment of the present disclosure.

The housing 202 also includes the sidewall receptacle 206 recessed into the sidewall 310, with the sidewall receptacle 206 being defined by a lip 322, and an inner wall 320 extending transversely from the lip 322 to a recessed surface 324. The inner wall 320 may measure between 0.30 mm to 1 mm from the lip 322 to the recessed surface 324, for example. In one specific example, the inner wall 206-2 measures 0.45 mm from the lip 206-4 to the surface 206-3. The sidewall receptacle 206 may include a diameter D of at about, for example, 2 mm to 5 mm. Although the sidewall receptacle 206 is illustrated as generally round, other shapes and geometries are also within the scope of this disclosure. For instance, the sidewall receptacle 206 can include a square or rectangular shape, such as shown in FIG. 5A. In such cases, the length and width of the rectangular/square may range from 2 mm to 5 mm, for example. Moreover, the multi-channel ROSA 112 can include two or more sidewall receptacles 206, such as shown in FIG. 5B.

The sidewall receptacle 206 may include non-conductive material on at least a portion thereof. For instance, the sidewall receptacle 206 can include the non-conductive material on the lip 322, the inner wall 320, or the recessed surface 324, or all three. In an embodiment, the recessed surface 324 can include a pad 402 that is made of the non-conductive material, such as shown in FIGS. 4B and 4C. In this embodiment, the pad can include an adhesive backing on one side to fixedly attach to the recessed surface 324. Some such examples of non-conductive materials include, for instance, plastic, paper, Teflon® (Polytetrafluoroethylene), glass, and any other non-conductive material suitable for providing electrical isolation. In some cases, the non-conductive material is made of two or more of the aforementioned materials. In some cases, the inner wall 320 can include a first type of non-conductive material and the recessed surface 324 can include a second type of non-conductive material different from the first type. In some cases, the entire sidewall 310 of the multi-channel ROSA 112, including the lip 322, inner wall 320, and the recessed surface 324, may each include the non-conductive material.

Figure 4A:
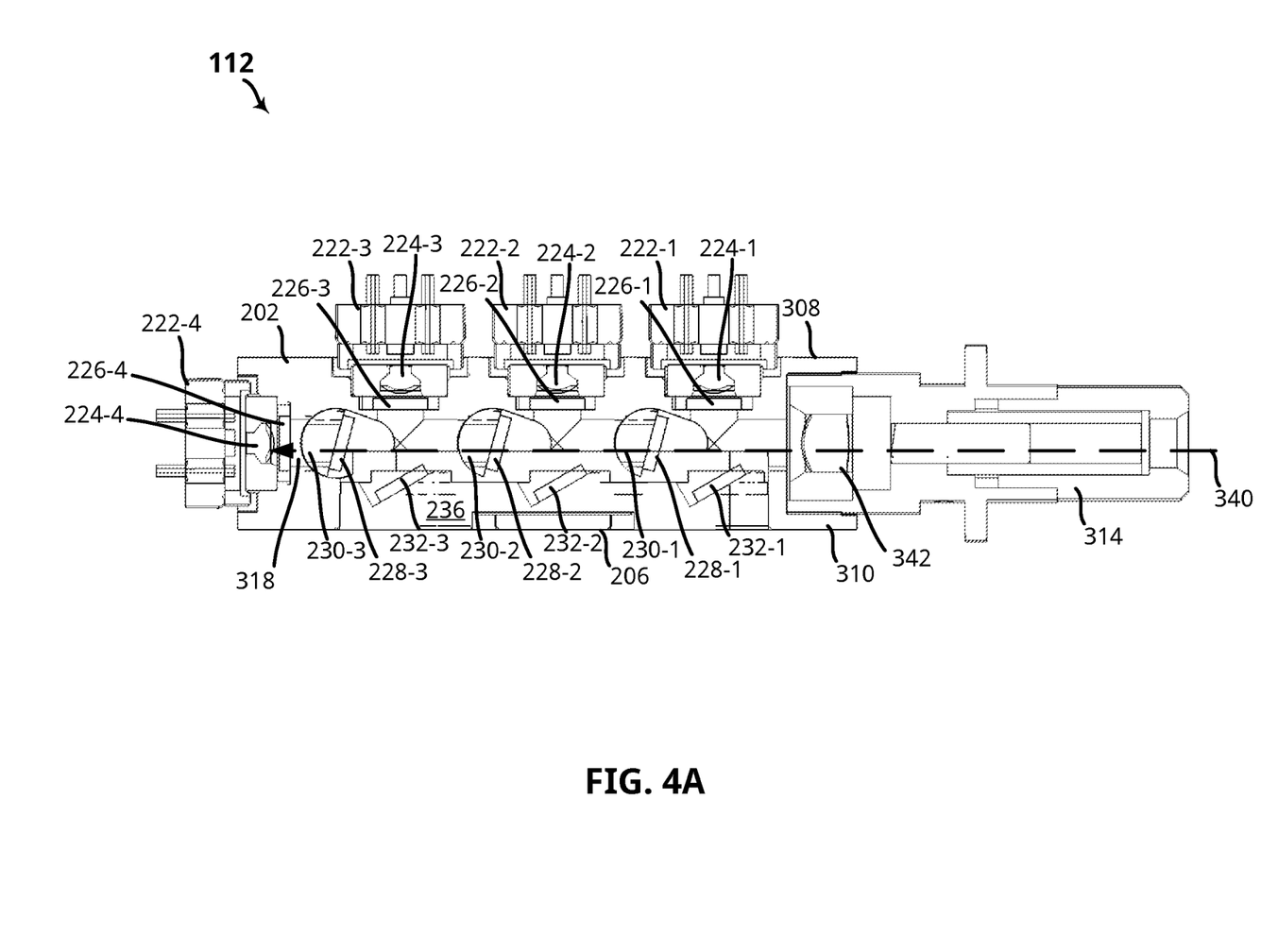
FIG. 4A is a cross-sectional view of the multi-channel ROSA of FIG. 3 without the housing, in accordance with an embodiment of the present disclosure.
Figure 4B:
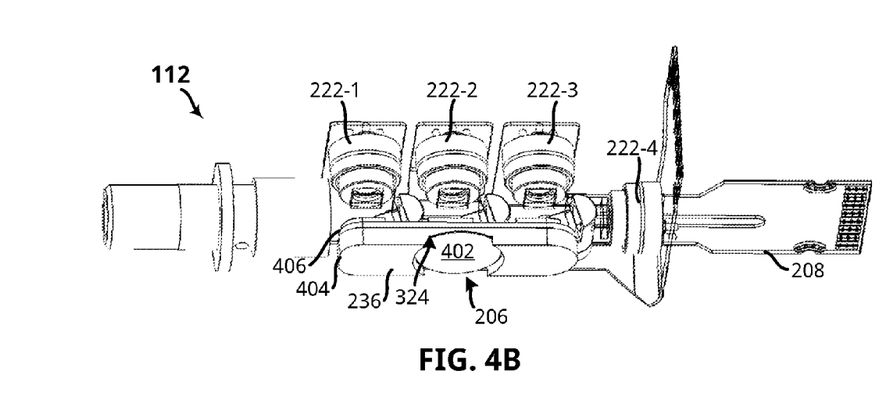
FIG. 4B is another perspective view of the multi-channel ROSA of FIG. 3 without the housing, in accordance with an embodiment of the present disclosure.
Figure 4C:
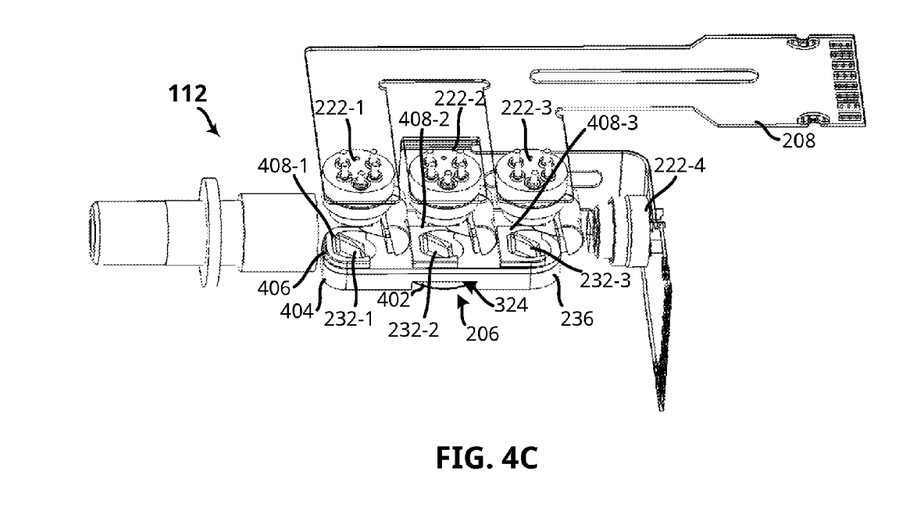
FIG. 4C is another perspective view of the multi-channel ROSA of FIG. 3, in accordance with an embodiment of the present disclosure.

FIG. 4A shows a cross-sectional view of the ROSA 112 of FIG. 3, in accordance with an embodiment of the present disclosure. As shown, the housing 202 also forms an internal cavity 318, or compartment, defined by an inner surface of the housing 202. The compartment 318 includes the light path 340, which extends through filters 228-1 to 228-3. The filters 228-1 to 228-3 may be configured to pass and reflect laser light at associated channel wavelengths. The filters 228-1 to 228-3, the focusing lens 342, and the optical coupling receptacle 314 are generally aligned or positioned along a longitudinal axis provided by the light path 340. The compartment 318 also includes mirrors 232-1 to 232-3, and filters 226-1 to 226-4 positioned adjacent the light path 340. The mirrors 232-1 to 232-3 may be fixedly attached to a mirror holder 236. The mirrors 232-1 to 232-3 may be associated with the filters 228-1 to 228-3, with each of the mirrors 232-1 to 232-3 being positioned relative to a corresponding filter and configured to receive reflected laser light having an associated channel wavelength. In addition, each of the filters 226-1 to 226-4 are positioned adjacent to photodiode packages 222-1 to 222-4, respectively, and are configured to receive laser light reflected by a respective one of the mirrors 232-1 to 232-3.

In an embodiment, the mirror holder 236 defines at least a portion of the sidewall receptacle 206, and is described in greater detail below. This combination of filters/mirrors may accurately be described as integrated de-multiplexing optics and can separate different channel wavelengths provided in an optical signal. De-multiplexing channel wavelengths using this configuration will now be discussed in the context of a four (4) channel TOSA, such as shown in FIG. 4.

The multi-channel ROSA 112 receives an optical signal through, for example, the receive optical fiber 117, with that optical signal having at least four (4) different channel wavelengths ($\lambda 1$, $\lambda 2$, $\lambda 3$, $\lambda 4$). In some cases, the channel wavelengths $\lambda 1$, $\lambda 2$, $\lambda 3$, $\lambda 4$ correspond with 1270 nm, 1290 nm, 1310 nm, and 1330 nm wavelengths, respectively, although other channel wavelengths are also within the scope of this disclosure. A multi-channel TOSA in another transceiver (not shown) coupled to the external fibers 124 may provide an optical signal with these channel wavelengths. In any event, the photodiode packages 222-1 to 222-4 may be associated with a respective channel wavelength. The multi-channel ROSA 112 also includes collimating lenses 224-1 to 224-4 to collimate light prior to photodiodes within photodiode packages 222-1 to 222-4 performing photo detection. The filters and mirrors along light path 340 can separate each individual channel wavelength and provide those separated channel wavelengths to an associated one of photodiode packages 222-1 to 222-4.

As should be appreciated, the multi-channel ROSA 112 may include additional channels and is not necessarily limited to the four (4) shown in FIG. 4A. That is, additional photodiode packages may be disposed along the sidewalls of housing 202.

FIG. 4B shows another perspective view of the multi-channel ROSA 112, in accordance with an embodiment of the present disclosure. As shown, the housing 202 of the multi-channel ROSA 112 is omitted for clarity. The mirror holder 236 includes at least first and second portions 404 and 406, respectively. The first portion of the mirror holder 236 defines at least a portion of the sidewall receptacle 206. The second portion 406 of the mirror holder 236 includes a plurality of mirror sub-mounts, which are shown in greater detail in FIG. 4C. In the embodiment shown, the sidewall receptacle 206 includes a non-conductive pad 402 positioned over the recessed surface 324. The non-conductive pad may be made of a non-conductive material such as, for example, plastic, paper, Teflon® (Polytetrafluoroethylene), and glass.

FIG. 4C shows another perspective view of the multi-channel ROSA 112, in accordance with an embodiment of the present disclosure. As shown, the housing 202 of the multi-channel ROSA 112 is omitted for clarity. The second portion 406 of the mirror holder 236 includes mirror sub-mounts 408-1 to 408-3 on a surface thereof. The mirror sub-mounts 408-1 to 408-3 may be configured to hold mirrors 232-1 to 232-3 at an angle sufficient to reflect laser light with associated channel wavelengths onto photodiode packages 222-1 to 222-3.

Referring now to FIG. 5A, there is a perspective view of the multi-channel ROSA 112, in accordance with an embodiment of the present disclosure. As shown, the sidewall receptacle 206' includes a generally square or rectangular shape. The sidewall receptacle 206' may comprise different regular or irregular shapes. For instance, the sidewall receptacle 206' may include a hexagonal or triangular shape.

In FIG. 5B, there is another perspective view of the multi-channel ROSA 112 including a plurality of sidewall receptacles 502. The plurality of sidewall receptacles 502 may be configured to each receive at least a portion of a TO can laser package from an adjacent multi-channel TOSA. As previously discussed, the sidewall receptacles 502 are not necessarily limited to a round shape as illustrated.

The multi-channel ROSA 112 may be formed as one piece or as multiple pieces attached together. Although the illustrated embodiments show the multi-channel ROSA 112 with a particular shape, other shapes and configurations are also possible. In other embodiments, for example, the housing 202 may be generally cylindrical.

Further Example Embodiments

In accordance with an aspect of the present disclosure, a multi-channel receiver optical subassembly (ROSA) including a plurality of photodiode packages is disclosed. The ROSA may comprise a housing including at least first and second sidewalls on opposite sides of the housing and extending along a first major axis from a first end to a second end, and forming a compartment defined by an inner surface therein, the first sidewall including at least one photodiode package, the second sidewall including at least one sidewall receptacle configured to receive an optical component package from an adjacent transmitter optical subassembly (TOSA).

In one aspect, the at least one sidewall receptacle may define a lip formed by the second sidewall and an inner wall extending from the lip transversely into the housing to a recessed surface.

In one aspect, the surface may include a pad made of non-conductive material.

In one aspect, the at least a portion of the at least one sidewall receptacle may include a non-conductive material.

In one aspect, the non-conductive material may be selected from a group consisting of glass, plastic, paper, and polytetrafluoroethylene.

In one aspect, the at least one sidewall receptacle may have a round shape.

In one aspect, the housing may further include an end sidewall at the first end of the housing and adjoining the first and second sidewall, the end sidewall including a photodiode package fixedly attached thereto.

In one aspect, the compartment may define a light path, the light path extending from the second end to the first end.

In one aspect, the ROSA may further comprise a first plurality of filters, the first plurality of filters aligned with the light path and configured to pass and reflect laser light at associated channel wavelengths.

In one aspect, the ROSA my further include a plurality of mirrors associated with the first plurality of filters, each of the mirrors being positioned relative to a corresponding filter of the first plurality of filters and configured to receive reflected laser light having an associated channel wavelength.

In one aspect, the ROSA may comprise a mirror holder holding each of the mirrors, the mirror holder defining at least a portion of the sidewall receptacle.

In one aspect, the ROSA may comprise a second plurality of filters, each of the second plurality of filters being positioned adjacent to one of the plurality of photodiode packages and configured to receive laser light reflected by a respective one of the mirrors.

In one aspect, the second end may include an optical coupling receptacle configured to optically couple a signal having multiple different channel wavelengths to a receive optical fiber.

In accordance with another aspect of the present disclosure, an optical transceiver module is disclosed. The optical transceiver module may include a transceiver housing, a multi-channel receiver optical subassembly (ROSA) including a plurality of photodiode packages, the ROSA comprising a housing including at least first and second sidewalls on opposite sides of the housing and extending along a first major axis from a first end to a second end, and forming a compartment defined by an inner surface therein, the first sidewall including at least one photodiode package, the second sidewall including at least one sidewall receptacle configured to receive an optical component package from an adjacent transmitter optical subassembly (TOSA), and a multi-channel transmitter optical assembly (TOSA) including at least one TO can laser package and located in the transceiver housing for transmitting optical signals at different channel wavelengths, wherein at least a portion of the at least one TO can laser package of the TOSA directly contacts the at least one sidewall receptacle of the ROSA, and wherein the sidewall receptacle provides electrical isolation between the ROSA and the TOSA.

In one aspect, the portion of the at least one TO can laser package may directly contact the at least one sidewall receptacle of the ROSA is at least one pin of the TO can laser package.

In one aspect, the at least one sidewall receptacle of the ROSA may define a lip formed by the second sidewall and an inner wall extending from the lip transversely into the housing of the ROSA to a recessed surface.

In one aspect, the surface of the sidewall receptacle may include a pad made of non-conductive material.

In one aspect, at least a portion of the sidewall receptacle of the ROSA may include a non-conductive material, wherein the non-conductive material is selected from a group consisting of glass, plastic, paper, and polytetrafluoroethylene.

In one aspect, the a gap between the ROSA and the can laser package of the TOSA may be at least 2 millimeters, and wherein the TOSA includes a flexible printed circuit board (FPC) positioned within the gap and electrically couples to pins of the TO laser can package.

In one aspect, the transceiver may be a Quad Small Form-factor Pluggable (QSFP) transceiver module and the ROSA may be configured to receive at four different channel wavelengths at transmission rates of at least about 10 Gbps per channel.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A multi-channel receiver optical subassembly (ROSA) including a plurality of photodiode packages, the ROSA comprising:
   a housing including at least first and second sidewalls on opposite sides of the housing and extending along a first major axis from a first end to a second end, and forming a compartment defined by an inner surface therein, the first sidewall including at least one photodiode package, the second sidewall including a conductive region and at least one sidewall receptacle with a non-conductive region disposed therein to receive an optical component package from an adjacent transmitter optical subassembly (TOSA).

2. The ROSA of claim 1, wherein the at least one sidewall receptacle is defined by a lip formed by the second sidewall and an inner wall extending from the lip transversely into the housing to a recessed surface.

3. The ROSA of claim 2, wherein the surface includes a pad made of non-conductive material.

4. The ROSA of claim 1, wherein at least a portion of the at least one sidewall receptacle includes a non-conductive material.

5. The ROSA of claim 4, wherein the non-conductive material is selected from a group consisting of glass, plastic, paper, and polytetrafluoroethylene.

6. The ROSA of claim 1, wherein the at least one sidewall receptacle has a round shape.

7. The ROSA of claim 1, further comprising an end sidewall at the first end of the housing and adjoining the first and second sidewall, the end sidewall including a photodiode package fixedly attached thereto.

8. The ROSA of claim 1, wherein the compartment defines a light path, the light path extending from the second end to the first end.

9. The ROSA of claim 8, further comprising a first plurality of filters, the first plurality of filters aligned with the light path and configured to pass and reflect laser light at associated channel wavelengths.

10. The ROSA of claim 9, further including a plurality of mirrors associated with the first plurality of filters, each of the mirrors being positioned relative to a corresponding filter of the first plurality of filters and configured to receive reflected laser light having an associated channel wavelength.

11. The ROSA of claim 10, further comprising a mirror holder holding each of the mirrors, the mirror holder defining at least a portion of the sidewall receptacle.

12. The ROSA of claim 9, further comprising a second plurality of filters, each of the second plurality of filters being positioned adjacent to one of the plurality of photodiode packages and configured to receive laser light reflected by a respective one of the mirrors.

13. The ROSA of claim 1, wherein the second end includes an optical coupling receptacle configured to optically couple a signal having multiple different channel wavelengths to a receive optical fiber.

14. An optical transceiver module comprising:
   a transceiver housing;
   a multi-channel receiver optical subassembly (ROSA) including a plurality of photodiode packages, the ROSA comprising:
      a housing including at least first and second sidewalls on opposite sides of the housing and extending along a first major axis from a first end to a second end, and forming a compartment defined by an inner surface therein, the first sidewall including at least one photodiode package, the second sidewall including a conductive region and at least one sidewall receptacle with a non-conductive region to receive an optical component package from an adjacent transmitter optical subassembly (TOSA); and
   a multi-channel transmitter optical assembly (TOSA) including at least one TO can laser package and located in the transceiver housing for transmitting optical signals at different channel wavelengths,
   wherein at least a portion of the at least one TO can laser package of the TOSA directly contacts the at least one sidewall receptacle of the ROSA, and wherein the sidewall receptacle provides electrical isolation between the ROSA and the TOSA.

15. The optical transceiver of claim 14, wherein the portion of the at least one TO can laser package directly contacting the at least one sidewall receptacle of the ROSA is at least one pin of the TO can laser package.

16. The optical transceiver of claim 15, wherein the at least one sidewall receptacle of the ROSA is defined by a lip formed by the second sidewall and an inner wall extending from the lip transversely into the housing of the ROSA to a recessed surface.

17. The optical transceiver of claim 15, wherein the surface of the sidewall receptacle includes a pad made of non-conductive material.

18. The optical transceiver of claim 17, wherein at least a portion of the sidewall receptacle of the ROSA includes a non-conductive material, wherein the non-conductive material is selected from a group consisting of glass, plastic, paper, and polytetrafluoroethylene.

19. The optical transceiver of claim 14, wherein a gap between the ROSA and the can laser package of the TOSA is at least 2 millimeters, and wherein the TOSA includes a flexible printed circuit board (FPC) positioned within the gap and electrically couples to pins of the TO laser can package.

20. An optical transceiver module comprising:
a transceiver housing;
a multi-channel receiver optical subassembly (ROSA) including a plurality of photodiode packages, the ROSA comprising:
  a housing including at least first and second sidewalls on opposite sides of the housing and extending along a first major axis from a first end to a second end, and forming a compartment defined by an inner surface therein, the first sidewall including at least one photodiode package, the second sidewall including at least one sidewall receptacle configured to receive an optical component package from an adjacent transmitter optical subassembly (TOSA); and
a multi-channel transmitter optical assembly (TOSA) including at least one TO can laser package and located in the transceiver housing for transmitting optical signals at different channel wavelengths,
wherein at least a portion of the at least one TO can laser package of the TOSA directly contacts the at least one sidewall receptacle of the ROSA, and wherein the sidewall receptacle provides electrical isolation between the ROSA and the TOSA, and wherein the transceiver is a Quad Small Form-factor Pluggable (QSFP) transceiver module and the ROSA is configured to receive at four different channel wavelengths at transmission rates of at least about 10 Gbps per channel.

* * * * *